No. 614,774. Patented Nov. 22, 1898.
W. C. SPIKER.
HANDLE BAR ATTACHMENT FOR BICYCLES.
(Application filed July 1, 1898.)
(No Model.)
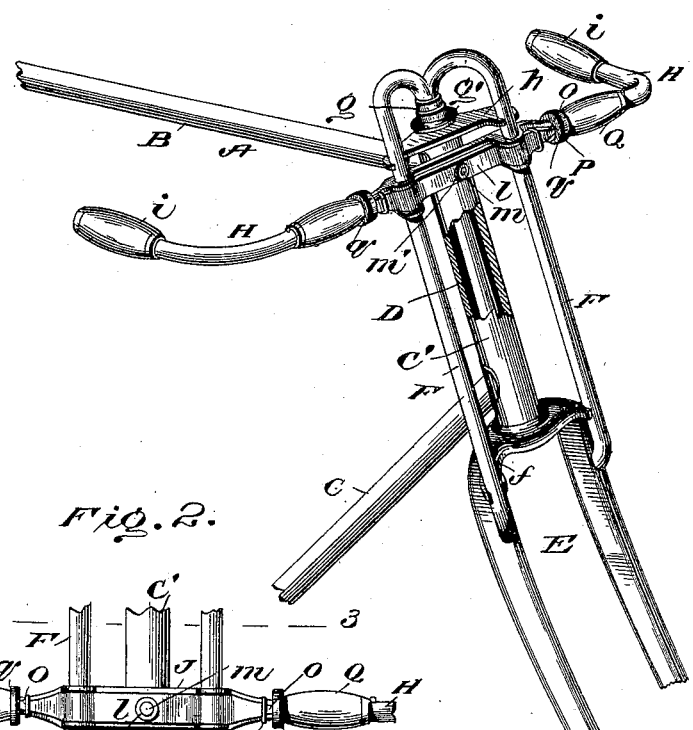
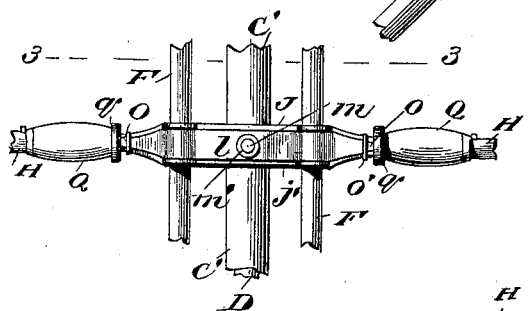
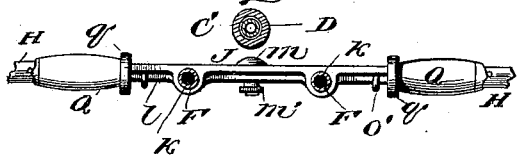
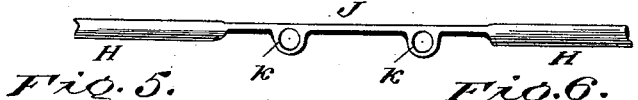
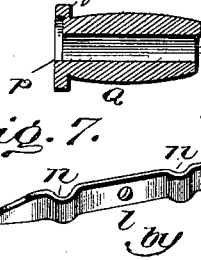
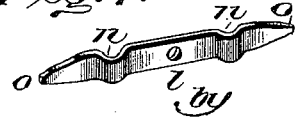
Inventor:
W. C. Spiker

UNITED STATES PATENT OFFICE.

WILLIAM CLAER SPIKER, OF CADIZ, OHIO.

HANDLE-BAR ATTACHMENT FOR BICYCLES.

SPECIFICATION forming part of Letters Patent No. 614,774, dated November 22, 1898.

Application filed July 1, 1898. Serial No. 684,971. (No model.)

*To all whom it may concern:*

Be it known that I, WILLIAM CLAER SPIKER, a citizen of the United States, residing at Cadiz, in the county of Harrison and State of Ohio, have invented certain new and useful Improvements in Handle-Bar Attachments for Bicycles; and I do hereby declare the following to be a full, clear, and exact description of the invention, such as will enable others skilled in the art to which it appertains to make and use the same.

This invention relates to improvements in the mode of mounting and adjustably securing the handle-bars of bicycles; and it consists, essentially, of a pair of guides arranged in advance and on opposite sides of the head-tube and connected at their lower ends to the tines of the steering-fork and at their upper ends to the spindle thereof, a handle-bar mounted to slide on said guides and carrying a clamping device adapted to engage the same to hold the bar immovable at any desired position thereon, and means also mounted on said bar for tightening and releasing the clamp.

The invention further consists of a handle-bar provided with a reduced central vertical plate or body portion having eyes or seats for the reception of the guides, a clamping-plate arranged parallel therewith and connected thereto and adapted to clamp the same to said guides, and oscillatory cam or eccentric sleeves mounted on the handle-bar at opposite sides of the central plate thereof and operatively connected with the said clamping-plate, whereby the latter may be readily and conveniently tightened and loosened without the necessity of the rider dismounting or removing his hands from the bar.

The invention also consists of certain novel features of construction, combination, and arrangement of parts, as will be hereinafter more fully described, and particularly pointed out in the appended claims.

The invention has for its object to provide a handle-bar which may be adjusted bodily to the elevation desired in a simple and convenient manner, which is adapted to afford greater leverage and thereby enable the wheel to be easily steered, and which is maintained in its proper position and held from tilting or working down at either side without the employment of extraneous fastening means, and, further, to provide simple and effective mechanism whereby said clamp may be operated and the handle-bar adjusted without the necessity of the rider dismounting or removing his hands from the bar.

In the drawings hereto annexed and forming a part of this specification, Figure 1 is a perspective view of the head-tube and coöperating parts of the frame of a bicycle having my invention applied thereto. Fig. 2 is a front elevation of same. Fig. 3 is a sectional plan view through the guide-tubes on line 3 3 of Fig. 2. Fig. 4 is a broken detail plan view of the handle-bar. Fig. 5 is an inner end view of one of the oscillatory sleeves. Fig. 6 is a detail sectional view of the same, and Fig. 7 is a detail perspective view of the clamping-plate.

Referring now more particularly to the drawings, wherein like letters of reference designate corresponding parts throughout the several views, A represents a portion of the frame of a bicycle, comprising the upper main tube B, lower main tube C, and steering-column or head-tube C'. Mounted in said head-tube, as usual, is the spindle D of the front or steering fork E, in the arms or tines of which the front wheel (not shown) is journaled. In accordance with my invention the usual construction is modified by the addition of a pair of vertical guide-tubes F, bent inwardly at their ends and brazed or otherwise secured at their lower ends to the tines of the front fork. The said lower ends of the guide-tubes are reinforced by braces $f$, projecting from the crown of the fork, while the upper ends thereof are connected with each other and stepped into a socket $g$, provided with a screw cap or collar $g'$, adapted to engage the upper end of the fork-spindle. The upper ends of the guides are reinforced in the plane of the head portion of the steering-column by a distance-plate $h$. This plate may be rigidly secured to the guides or provided, as shown, with seats for the reception of the same, and it may also be rigidly secured to the head-tube or made detachable and adapted to be held in place, as illustrated in the present instance, by the collar $g'$. By this construction it will be seen that the fork and its spindle are rigidly connected to turn with the guide-tubes and yet may be conveniently detached from the head-tube when desired.

The handle-bar comprises in its construction the usual bent tubular handles H, which may be of any approved form and provided with grips *i*. The body portion or main stem of this bar extends through the open space between the guide-tubes and head-tube and is reduced to form a vertical plate *j*, constituting an extension of the handles, said plate being provided on opposite sides of its center with eyes *k* for the reception of said guide-tubes, whereby the handle-bar is fitted to slide thereon. Arranged to bear against the front side of the guide-tubes and extending parallel with the said central plate of the handle is a clamping-plate *l*, which is suitably secured centrally to the latter, as by means of a bolt *m* and milled nut *m'*, and bent on opposite sides thereof to form semicircular bearing portions *n*, adapted to bind against the guide-tubes between the eyes *k*. These eyes also serve as stops to hold the clamping-plate from turning on its securing-bolt *m*.

The ends of the clamping-plate are reduced to form fingers or projections *o*, which extend into sockets *p*, formed in the inner faces of heads *q* on the inner ends of sleeves Q, mounted to oscillate on the handles of the bar. The walls of these sockets are turned out to form cam or eccentric faces *p'*, upon which the fingers of the clamping-plate are adapted to ride, so that by turning the sleeves in one direction or the other the free ends of said clamping-plate will be moved inwardly or outwardly and caused to bind firmly against or release the guide-tubes. By this means the handle-bar may be quickly and conveniently adjusted to the desired elevation and clamped without the necessity of the rider dismounting or even removing his hands from the bar. On the plate J are loops *o'*, which loosely inclose and limit the outward movement of the fingers *o*. The inner surfaces of the eyes of the central plate of the handle and bearing portions of the clamping-plate are preferably lined with rubber or some other suitable material, which will prevent the same from slipping on the guide-tubes and defacing the latter by repeated adjustment of the bar, and, if desired, the oscillatory sleeves may be adapted for use as grips to enable the hands of the rider to be placed in close proximity to the head-tube, where the handle-bar may be conveniently manipulated to steer the machine and the adjustment thereof quickly controlled.

From the above description, taken in connection with the accompanying drawings, the construction and operation of the invention will be readily understood, and it will be seen that it provides a handle-bar which is comparatively simple in construction, capable of being adjusted bodily to suit the convenience of the rider, and also adapted by reason of the peculiar construction and arrangement of the guide-tubes and manner of mounting the handle-bar thereon to permit of greater leverage being obtained, thereby enabling the rider to much more readily and easily steer and control the machine when an obstruction is encountered by the front wheel. It will also be seen that by employing guides on opposite sides of the head-tube, giving two points of bearing on opposite sides of its center, the handle-bar is strengthened and maintained in proper position against tilting or working down at either side when the parts are worn without employing additional fastening means to avoid this objection. The handle-bar may thus be readily and conveniently adjusted to enable the machine to be easily steered and to suit the comfort and convenience of the rider under the varying conditions incident to fast and slow riding, ascending and descending heavy grades, &c., and this is accomplished without changing the angles of the grips, as is necessary in the usual form of adjustable handle-bar.

It will be understood that the invention is not limited to the exact features of construction and arrangement set forth as constituting its preferred form, but that these may be modified in certain respects, as circumstances or the judgment of those skilled in the art may dictate, without departing from the essential features of the invention.

Having thus fully described my invention, what I claim as new, and desire to secure by Letters Patent, is—

1. In a bicycle, the combination with the head-tube and the front fork and its spindle, of a pair of guides arranged in advance and on opposite sides of the head-tube and connected at their lower ends to the tines of the fork and at their upper ends to the spindle, and a handle-bar adjustably mounted on said guides and provided with a clamp adapted to engage the same, substantially as described.

2. In a bicycle, the combination with the head-tube and the front fork and its spindle, of a pair of guides arranged in advance and on opposite sides of the head-tube and connected at their lower ends to the fork and at their upper ends to the spindle, a handle-bar provided with handles and a reduced central plate bearing on one side of the guides, a clamping-plate secured at its center thereto and having its ends arranged to bear against the opposite side of said guides, and oscillatory cam-sleeves on the bar for operating the said free ends of the clamp, substantially as described.

3. In a bicycle, the combination with the head-tube and the front fork and its spindle, of a pair of guides arranged in advance and on opposite sides of the head-tube and connected at their lower ends to the fork and fitted at their upper ends in a socket, a screw cap or collar on said socket and engaging the upper end of the spindle, a transverse detachable distance-plate confined by said collar and reinforcing the guides in the plane of the upper end of the head-tube, a handle-bar adjustably mounted on the guides and provided with a clamp to engage the same, and operating devices on the bar for tightening and loosening said clamp, substantially as described.

4. In a bicycle, the combination with the head-tube and the front fork and its spindle, of a pair of guides arranged in advance and on opposite sides of the head-tube and connected at their lower ends to the tines of the fork and at their upper ends to the spindle, a handle-bar adjustably mounted on the guides, a clamping-plate thereon provided with fingers at the ends thereof, and oscillatory sleeves on the bar provided with sockets for the reception of said fingers, said sockets having cam-shaped walls upon which the fingers are adapted to ride, substantially as described.

5. In a bicycle, the combination with the head-tube and the front fork and its spindle, of a pair of guides arranged in advance and on opposite sides of the head-tube and connected at their lower ends to the tines of the fork and at their upper ends to the spindle, a handle-bar provided with handles and a reduced central plate bearing on one side of the guides, a clamping-plate extending parallel therewith and secured thereto and arranged to bear against the opposite side of the said guides, said clamping-plate being provided with end fingers, and oscillatory sleeves on the bar provided with sockets for the reception of said fingers, said sockets having cam-shaped walls upon which the fingers are adapted to ride, substantially as described.

In testimony whereof I affix my signature in presence of two witnesses.

WILLIAM CLAER SPIKER.

Witnesses:
    WM. C. BIGGER,
    M. W. SPIKER.